United States Patent
Chen et al.

(10) Patent No.: US 8,275,504 B2
(45) Date of Patent: Sep. 25, 2012

(54) STABILIZATION APPARATUS AND METHOD FOR STABLING LOAD VOLTAGE OF VEHICLE

(75) Inventors: Chin-Hou Chen, Taipei (TW); Bo-Wen Tang, Taipei (TW); Ko-Yu Hsiao, Taipei (TW)

(73) Assignee: Delta Electronics, Inc., Taoyuan County (TW)

( * ) Notice: Subject to any disclaimer, the term of this patent is extended or adjusted under 35 U.S.C. 154(b) by 332 days.

(21) Appl. No.: 12/650,258

(22) Filed: Dec. 30, 2009

(65) Prior Publication Data

US 2011/0160955 A1 Jun. 30, 2011

(51) Int. Cl.
*B60L 9/00* (2006.01)
*G05D 1/00* (2006.01)
(52) U.S. Cl. .................. 701/22; 701/36; 701/1
(58) Field of Classification Search .............. 701/43
See application file for complete search history.

(56) References Cited

U.S. PATENT DOCUMENTS

2005/0038585 A1* 2/2005 Asaumi et al. .............. 701/43

* cited by examiner

*Primary Examiner* — Khoi Tran
*Assistant Examiner* — Bhavesh V Amin
(74) *Attorney, Agent, or Firm* — Muncy, Geissler, Olds & Lowe, PLLC

(57) ABSTRACT

A stabilization apparatus for stabling load voltage of vehicle is applied to a vehicle battery unit, a vehicle computer unit and a vehicle load unit. The stabilization apparatus for stabling load voltage of vehicle includes a voltage boost unit and a microcontroller unit. The voltage boost unit is electrically connected to the vehicle battery unit and the vehicle load unit. The microcontroller unit is electrically connected to the voltage boost unit and the vehicle computer unit. When the voltage of the vehicle battery unit is going to drop, a voltage-drop signal is sent from the vehicle computer unit to the microcontroller unit. The voltage boost unit is controlled by the microcontroller unit to supply a boosted voltage to the vehicle load unit.

8 Claims, 3 Drawing Sheets

STABILIZATION APPARATUS AND METHOD FOR STABLING LOAD VOLTAGE OF VEHICLE

BACKGROUND OF THE INVENTION

1. Field of the Invention

The present invention relates to a stabilization apparatus and method for voltage, especially to a stabilization apparatus and method for stabling load voltage of vehicle.

2. Description of Prior Art

Battery is important component for vehicle such as automobile, and it provides electric source for starting automobile engine and to electric accessories such as audio equipment and vehicle headlights.

The voltage in the automobile battery has an abrupt drop at the moment the engines starts (ignites), namely, the voltage of the automobile battery has a short period of instability at that moment. The voltage instability generally causes an interrupt for vehicle audio equipment and an unwanted flash in vehicle headlights.

As global warming becomes serious issue, Hybrid Electric Vehicles (HEV) also becomes a hot research topic. For example, in the micro hybrid electric vehicles, an electric motor facilitates the internal combustion engine (ICE) to higher rotation speed when the internal combustion engine starts, thus enhancing the operating efficiency of the internal combustion engine. The micro hybrid electric vehicle turns off the internal combustion engine when the vehicle is decelerating or braking to save fuel consumption. The micro hybrid electric vehicle activates the internal combustion engine again when it starts accelerating.

As can be known from above description, the micro HEV turns off the internal combustion engine when it is decelerating or braking; and the micro HEV activates the internal combustion engine again when it is accelerating. Therefore, micro HEV has more frequent on-off operation for the internal combustion engine, in comparison with the conventional non-HEV automobile. Therefore, the micro HEV is much affected by the problem of voltage instability (namely, the voltage drop in the vehicle battery when the engine starts).

SUMMARY OF THE INVENTION

It is an object to provide a stabilization apparatus for stabling load voltage of vehicle, thus stabilizing load voltage during engine start.

It is another object to provide a stabilization method for stabling load voltage of vehicle, thus stabilizing load voltage during engine start.

Accordingly, the present invention provides a stabilization apparatus for stabling load voltage of vehicle is used for a vehicle battery unit, a vehicle computer unit and a vehicle load unit. The stabilization apparatus comprising: at least one voltage boost unit electrically connected to the vehicle battery unit and the vehicle load unit; and a microcontroller unit electrically connected to the at least one voltage boost unit and the vehicle computer unit. The microcontroller unit is adapted to control the voltage boost unit to supply a boosted voltage to the vehicle load unit when the vehicle computer unit sends a voltage-drop signal to the microcontroller unit to inform the microcontroller unit that the voltage of the vehicle battery unit begins to drop.

Accordingly, the present invention provides a stabilization method for stabling load voltage of vehicle is used for a vehicle battery unit, a vehicle computer unit and a vehicle load unit. The stabilization method first provides a microcontroller unit electrically connected to the vehicle computer unit and at least one voltage boost unit electrically connected to the microcontroller unit, the vehicle battery unit and the vehicle load unit. The vehicle computer unit sends a voltage-drop signal to the microcontroller unit to inform the microcontroller unit that the voltage of the vehicle battery unit begins to drop. The microcontroller unit controls the voltage boost unit to supply a boosted voltage to the vehicle load unit.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
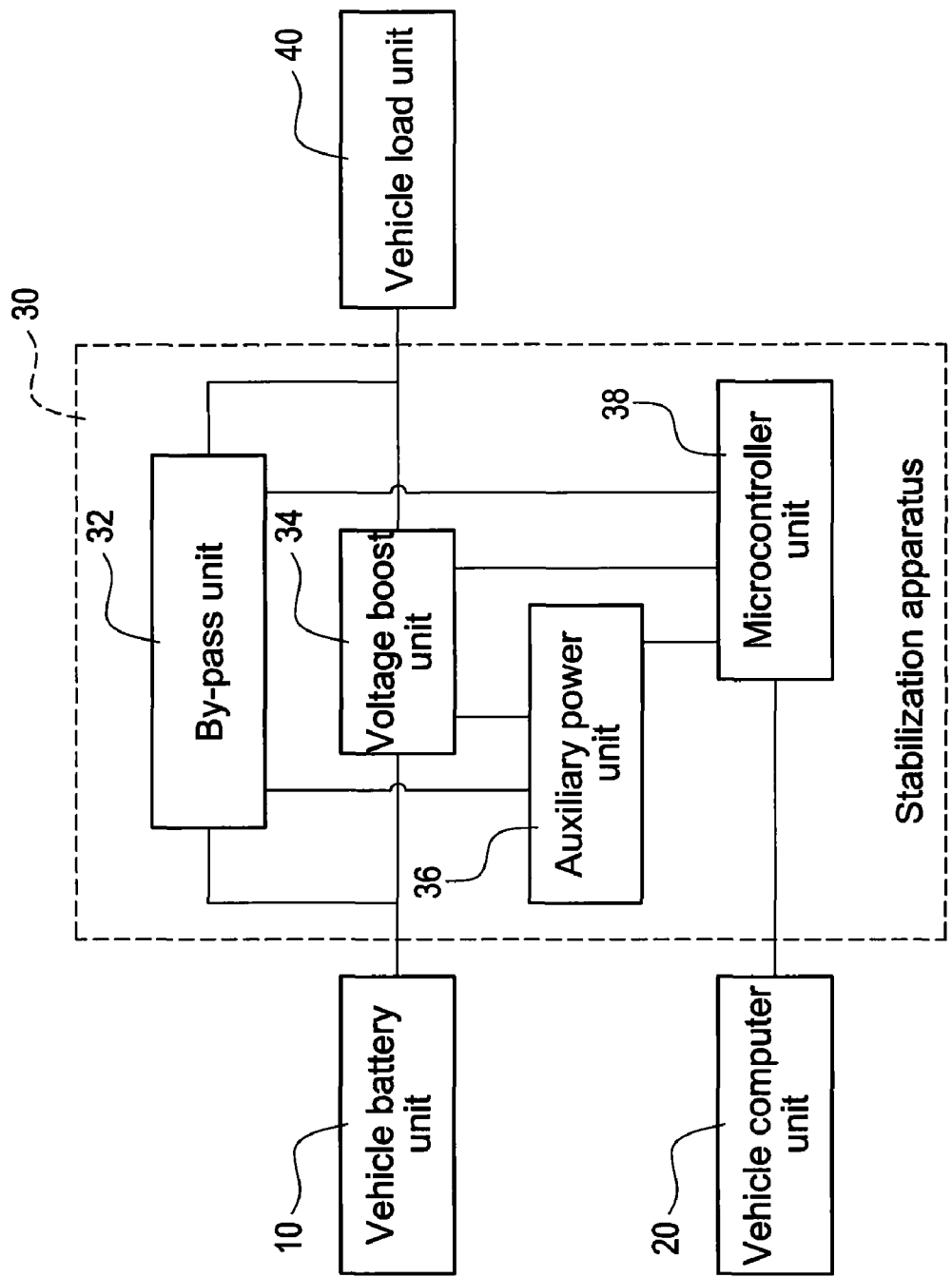
FIG. 1 is a block diagram for the stabilization apparatus for stabling load voltage of vehicle according to the present invention.

FIG. 1 is a block diagram for the stabilization apparatus for stabling load voltage of vehicle according to the present invention. The stabilization apparatus 30 for stabling load voltage of vehicle is applied to a vehicle battery unit 10, a vehicle computer unit 20 and a vehicle load unit 40. The vehicle battery unit 10 is, for example, vehicle battery, and is used to start the vehicle engine and supply electric power to vehicle accessories. The vehicle computer unit 20 is, for example, a trip computer or an Electronic Control Units (ECU), and the vehicle computer unit 20 has functions of monitoring voltage of the vehicle battery unit 10. However, this function is well known in prior art and the descriptions thereof are omitted here for brevity. The vehicle load unit 40 is, for example but not limited to, headlight or audio equipment.

In the prior art HEV, the vehicle battery unit 10 is in direct electrical connection with the vehicle load unit 40. In the present invention, the stabilization apparatus 30 for stabling load voltage of vehicle is electrically connected to the vehicle battery unit 10, the vehicle computer unit 20 and the vehicle load unit 40 for providing voltage stabilization function.

The stabilization apparatus 30 for stabling load voltage of vehicle comprises at least one voltage boost unit 34 electrically connected to the vehicle battery unit 10 and the vehicle load unit 40, a microcontroller unit 38 electrically connected to the at least one voltage boost unit 34 and the vehicle computer unit 20, a by-pass unit 32 arranged in parallel with the at least one voltage boost unit 34 and electrically connected to the vehicle battery unit 10 and the vehicle load unit 40, an auxiliary power unit 36 electrically connected to the a by-pass unit 32, the at least one voltage boost unit 34, and the microcontroller unit 38.

Figure 2:
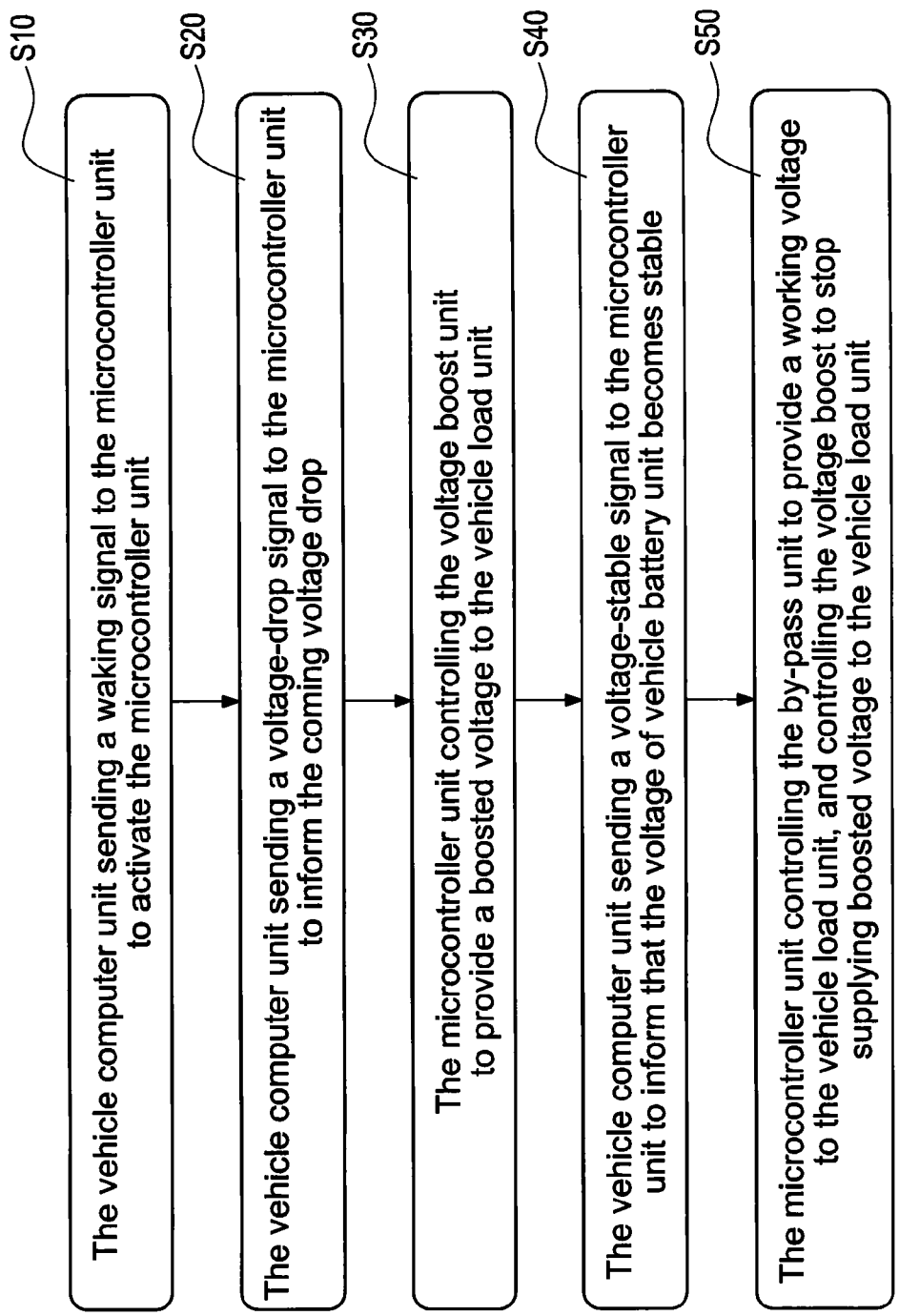
FIG. 2 shows a flowchart of the stabilization method for stabilizing vehicle load according to the present invention.

FIG. 2 shows a flowchart of the stabilization method for stabilizing vehicle load according to the present invention. With reference also to FIG. 1, at first, the vehicle computer unit 20 sends a waking signal to the microcontroller unit 38 to activate the microcontroller unit 38 (S10). When the voltage of the vehicle battery unit 10 begins to drop, namely, when the vehicle engine begins to start again, the vehicle computer unit 20 sends a voltage-drop signal to the microcontroller unit 38 to inform the coming voltage drop of vehicle battery unit 10 to the microcontroller unit 38 (S20). Afterward, the microcontroller unit 38 controls the voltage boost unit 34 to provide a boosted voltage to the vehicle load unit 40 (S30). Therefore, the problem of supplied voltage drop to the vehicle load unit 40, which is caused by the sudden voltage drop in the vehicle battery unit 10 during engine ignition, can be overcome.

When the voltage of the vehicle battery unit 10 is stable again, the vehicle computer unit 20 sends a voltage-stable signal to the microcontroller unit 38 to inform that the voltage of vehicle battery unit 10 becomes stable (S40). Afterward, the microcontroller unit 38 controls the by-pass unit 32 to provide a working voltage to the vehicle load unit 40, and the microcontroller unit 38 controls the voltage boost unit 34 such that the voltage boost unit 34 stops supplying boosted voltage to the vehicle load unit 40 (S50).

The electric power of the by-pass unit 32 and the voltage boost unit 34 are mainly from the vehicle battery unit 10. When the electric power of the vehicle battery unit 10 is not sufficient, the auxiliary power unit 36 can supply electric power to the by-pass unit 32 and the voltage boost unit 34. To ensure the successful power supplying from the voltage boost unit 34 to the vehicle load unit 40, the auxiliary power unit 36 immediately supplies power to the voltage boost unit 34 once the electric power of the vehicle battery unit 10 is not sufficient. Moreover, the auxiliary power unit 36 can also supply electric power to the microcontroller unit 38.

The vehicle computer unit 20 and the microcontroller unit 38 can communicate to each other and other components through communication network such as Local Interconnect Network (LIN) or Controller Area Network (CAN). Therefore, the vehicle computer unit 20 can be informed the working condition of the control module 30 for stabling load voltage of vehicle. The microcontroller unit 38 further comprises logic circuits (not shown) to control the on/off of the by-pass unit 32 and the voltage boost unit 34.

Figure 3:
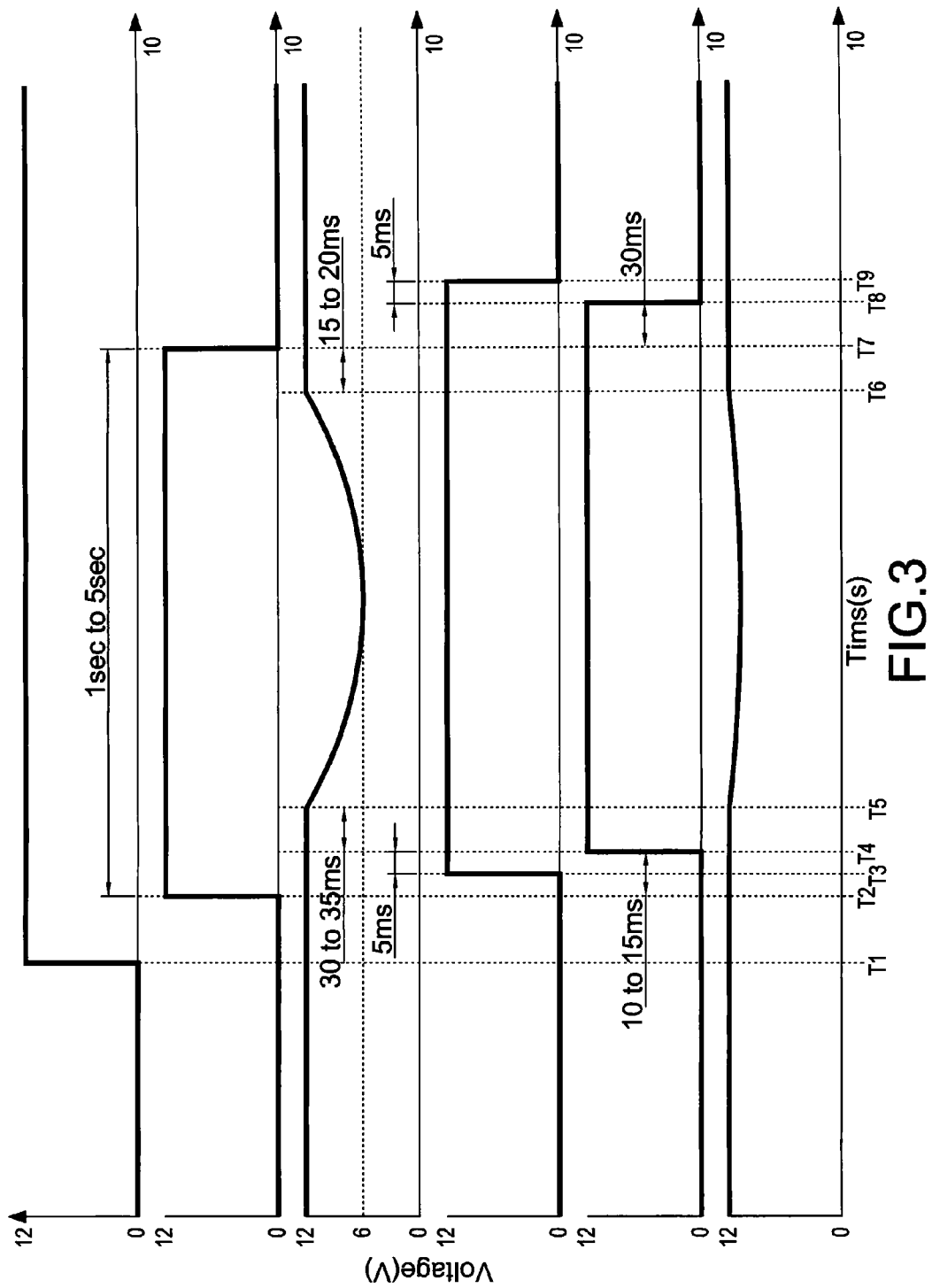
FIG. 3 shows the timing chart for different voltage curves in the present invention.

FIG. 3 shows the timing chart for different voltage curves in the present invention. More particularly, there are six curves in FIG. 3, and which are, from top to bottom order, described hereinafter. The first curve is the waking signal sent from the vehicle computer unit 20 to the microcontroller unit 38, which is used to activate the microcontroller unit 38. The second curve is voltage-drop signal sent from the vehicle computer unit 20 to the microcontroller unit 38, which informs the coming voltage drop of vehicle battery unit 10. The third curve is the voltage curve for the vehicle battery unit 10, where an apparent voltage drop due to engine ignition can be seen from the curve. The fourth curve is the voltage in the by-pass unit 32. The fifth curve is the voltage of the voltage boost unit 34. The sixth curve is the voltage supplied to the vehicle load unit 40. As can be seen from this figure, the voltage supplied to the vehicle load unit 40 is relatively stable (by the boosted voltage from the voltage boost unit 34) when the engine is ignited and a substantial voltage drop is present in the vehicle battery unit 10.

Moreover, the number of the voltage boost unit 34 can be multiple in the control module 30 for stabling load voltage of vehicle. In this situation, the microcontroller unit 38 controls the multiple voltage boost units 34 in interleaved control manner. However, the microcontroller unit 38 can control the multiple voltage boost units 34 in other manner, which is not limited to the interleaved control.

To sum up, in the present invention, the voltage boost unit 34 is in series connection between the vehicle battery unit 10 and the vehicle load unit 40. When the output voltage of the vehicle battery unit 10 begins to drop due to engine ignition, the voltage boost unit 34 provides a boosted voltage to the vehicle load unit 40. When the output voltage of the vehicle battery unit 10 returns to a stable value, the by-pass unit 32 provides electric power to the vehicle load unit 40. The vehicle load unit 40 can be supplied with stable DC voltage at the moment the engine is ignited. The voltage drop occurred to the vehicle load unit 40, which is due to the voltage drop in the vehicle battery unit 10, can be overcome.

What is claimed is:

1. A stabilization apparatus for stabling load voltage of vehicle used for a vehicle battery unit, a vehicle computer unit and a vehicle load unit, the stabilization apparatus comprising:
    at least one voltage boost unit electrically connected to the vehicle battery unit and the vehicle load unit;
    a microcontroller unit electrically connected to the at least one voltage boost unit and the vehicle computer unit; and
    a by-pass unit being in parallel connection with the voltage boost unit and electrically connected between the vehicle battery unit and the vehicle load unit
    wherein the microcontroller unit is adapted to control the voltage boost unit to supply a boosted voltage to the vehicle load unit when the vehicle computer unit sends a voltage-drop signal to the microcontroller unit to inform the microcontroller unit that the voltage of the vehicle battery unit begins to drop; the microcontroller unit is adapted to control the by-pass unit to supply voltage to the vehicle load unit when the vehicle computer unit sends a voltage-stable signal to the microcontroller unit to inform the microcontroller unit that the voltage of the vehicle battery unit begins to be stable.

2. The stabilization apparatus in claim 1, further comprising an auxiliary power unit electrically connected to the by-pass unit, the voltage boost unit and the microcontroller unit.

3. The stabilization apparatus in claim 1, wherein the vehicle computer unit and the microcontroller unit communicate to each other through local interconnect network (LIN) or controller area network (CAN).

4. The stabilization apparatus in claim 1, wherein the number of the voltage boost unit is multiple, and the microcontroller unit is adapted to control the multiple voltage boost units in interleaved control manner.

5. A stabilization method for stabling load voltage of vehicle used for a vehicle battery unit, a vehicle computer unit and a vehicle load unit, the stabilization method comprising:
    a) providing a microcontroller unit electrically connected to the vehicle computer unit and at least one voltage boost unit electrically connected to the microcontroller unit, the vehicle battery unit and the vehicle load unit;
    b) the vehicle computer unit sending a voltage-drop signal to the microcontroller unit to inform the microcontroller unit that the voltage of the vehicle battery unit begins to drop;
    c) the microcontroller unit controlling the voltage boost unit to supply a boosted voltage to the vehicle load unit
    d) providing a by-pass unit electrically connected to the microcontroller unit, the vehicle battery unit and the vehicle load unit;
    e) the vehicle computer unit sending a voltage-stable signal to the microcontroller unit and
    f) the microcontroller unit controlling the by-pass unit to supply voltage to the vehicle load unit.

6. The stabilization method in claim 5, further comprising sub-step in the step e):
    the microcontroller unit controlling the voltage boost unit to stop supplying voltage to the vehicle load unit.

7. The stabilization method in claim 5, further comprising sub-step before the step b):
   b1) the vehicle computer unit sending a waking signal to the microcontroller unit to activate the microcontroller unit.

8. The stabilization method in claim 5, further comprising:
   g) providing an auxiliary power unit electrically connected to the by-pass unit, the voltage boost unit and the microcontroller unit; and
   h) the auxiliary power unit supplying electric power to the by-pass unit, the voltage boost unit and the microcontroller unit.

* * * * *